March 13, 1951  P. A. DYER ET AL  2,544,986
GARDEN HOSE HOLDER
Filed Nov. 17, 1949
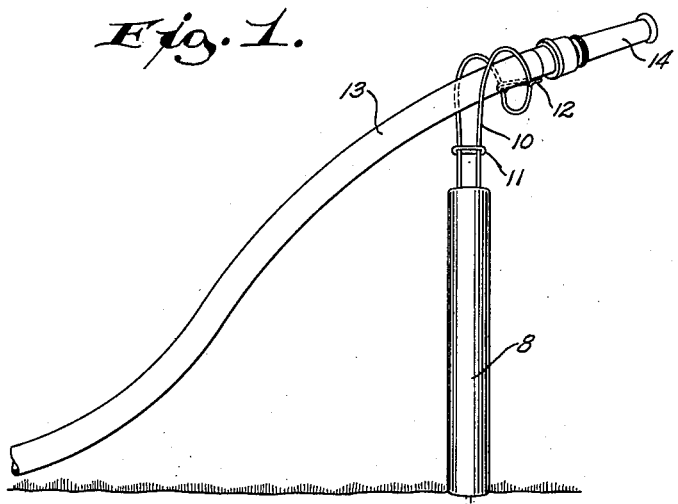
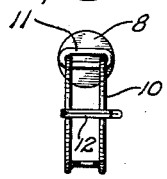
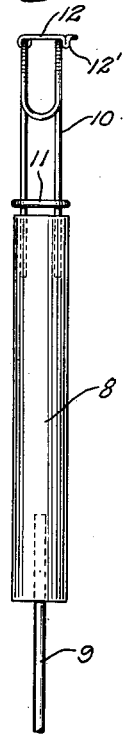
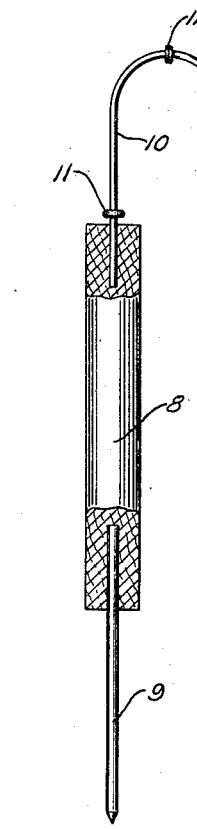
INVENTORS
Philip A. Dyer +
Robert J. Dummer,
BY Morsell + Morsell
ATTORNEYS.

Patented Mar. 13, 1951

2,544,986

UNITED STATES PATENT OFFICE 2,544,986

GARDEN HOSE HOLDER

Philip A. Dyer and Robert J. Dummer,
La Crosse, Wis.

Application November 17, 1949, Serial No. 127,836

5 Claims. (Cl. 248—76)

This invention relates to improvements in garden hose holders.

A primary object of the present invention is to provide a simple and effective form of garden hose holder capable of being inserted into a lawn or garden plot to adjustably support the nozzle end of the hose in spaced relation to the ground and to direct the spray or stream of water issuing from the nozzle at a desired elevation and toward a selected portion of the lawn or garden.

A further object of the invention is to provide a garden hose holder having a clamp portion to receive the nozzle end portion of a hose, said clamp portion being provided with an adjustable clasp to support the hose at a desired inclination, and a compressing link for causing the clamp portion of the device to tightly releasably embrace a portion of the hose.

A further object of the invention is to provide a garden hose holder which may be quickly inserted into the ground at a desired angle and with which the nozzle end of a hose may be quickly adjustably engaged or disengaged.

A further object of the invention is to provide a garden hose holder which is durable and compact, which will fit any size of nozzle equipped hose and which minimizes vibration caused by water pressure in the hose.

A further object of the invention is to provide a garden hose holder which is of very simple construction, is neat and attractive in appearance, is inexpensive, and is well adapted for the purposes set forth.

In the accompanying drawing in which the same reference characters indicate the same parts in all of the views:

Fig. 1 is a perspective view of the improved garden hose holder having its spike or stud end inserted in the ground and having its clamping end engaging the nozzle end portion of a garden hose;

Fig. 2 is a side view of the garden hose holder on a slightly larger scale with parts broken away and in section;

Fig. 3 is a front view of the garden hose holder; and

Fig. 4 is a top view.

Referring now more particularly to the drawing, it will appear that the garden hose holder comprises a cylindrical body portion 8 of a substantial length and preferably formed of wood. Within a bore in the lower or inner end of the body portion 8 there is tightly inserted the inner end of an elongated pointed stem or spike 9 of metal. Having a forced fit in bores in the other end of the body 8 are the extremities of the shanks of a wire clamping member 10 of bifurcated formation and having its closed outer end curved laterally and downwardly. The arms of the bifurcated clamping member have inherent springiness or yieldability and the same, toward their inner anchored ends, slidably carry a compressing link 11. The curved outer end portions of the arms of the clamping member 10 carry a clasp 12 which has one end portion pivotally and slidably embracing one of the arms of the clamping member 10 and having at its free end a protuberance 12' to clampingly impinge against the other arm of the clamping member when the clasp 12 is in an adjusted, operative position.

In use, the improved garden hose holder has its spike or studded end portion 9 inserted into the ground or lawn at a desired location and to a depth sufficient to firmly anchor the entire holder. The holder will assume a substantially vertical or inclined position with the clamping member 10 at its upper or outer end. Between the bifurcations of the clamping member 10 the nozzle end portion of a garden hose 13 is inserted in the manner shown in Fig. 1 and to cause the hose to lie in a desired inclination the clasp 12 is adjusted so that it will underlie and support the nozzle end of the hose and direct the nozzle 14 in the proper direction and at the desired elevation. To insure firm retention of the hose within the clamping member 10 the compressing link 11 is slid upwardly outwardly on the arms of the clamping member 10 to draw the same toward each other and into tight enagement with the hose.

The improved garden hose holder makes it possible to conveniently sprinkle or spray any desired portion of a lawn or garden with the conventional adjustable hoze nozzle which can be aimed accurately at shrubs or trees or toward grass or garden plots bordering walks and buildings. With the improved garden hose holder it is also possible to reposition the hose for sprinkling other areas without getting into the water spray and without turning off the water at the tap. Due to the spaced yieldable arms of the clamping member 10 the device will fit any conventional garden hose and the wooden body member 8 minimizes vibration due to water pressure in the hose.

The garden hose holder is of simple and novel construction, is easy to mount and manipulate, and is well adapted for the purposes set forth.

What is claimed as the invention is:

1. A hose support, comprising a body member having ground engaging means at one end, a resilient clamp member supported on and projecting from the other end portion of said body member, said clamp member being of curved, bifurcated formation whereby the nozzle end portion of a hose may be releasably impinged between the bifurcated portions of the clamp member, and a hose supporting and positioning clasp adjustably movable on and carried directly by the curved portion of said clamp member.

2. A hose support, comprising an elongated cylindrical body member, a spike projecting from one end thereof, a spring metal clamp fixedly projecting from the other end of the body member, said clamp being hook-shaped and including spaced arms between which the nozzle end portion of a hose is inserted, means on the clamp for releasably drawing said arms together, and adjustable means on the clamp to underlie the supported hose and determine its elevation and inclination.

3. A hose support, comprising an elongated cylindrical wooden body member, a metallic spike projecting from one end thereof, a metal clamp fixedly projecting from the other end of the body member, said clamp being hook-shaped and including spaced yieldable arms between which the nozzle end portion of a hose is inserted, a link slidably mounted on the clamp arms for releasably drawing the latter together, and means longitudinally shiftably mounted on the clamp to transversely underlie the supported hose and determine its elevation and inclination.

4. A hose support, comprising an elongated wooden body member, a metallic spike projecting from the lower end thereof, a clamp fixedly projecting from the upper end of the body member, said clamp being hook-shaped and including spaced yieldable wire arms between which the nozzle end portion of a hose is inserted, a link embracing and slidably mounted on the clamp arms for releasably drawing the latter together, and a clasp swingably longitudinally shiftably mounted on an outer end portion of the clamp to transversely underlie a desired portion of the supported hose to determine its elevation and inclination.

5. A hose support, comprising a body member having at one end a ground engaging portion; a spring metal clamp fixedly projecting from the other end of the body member, said clamp being hook-shaped and including spaced arms between which the nozzle end portion of a hose is impinged, and adjustable means on the clamp to underlie the supported hose to directly engage it and determine its elevation and inclination.

PHILIP A. DYER.
ROBERT J. DUMMER.

REFERENCES CITED

The following references are of record in the file of this patent:

UNITED STATES PATENTS

| Number | Name | Date |
|---|---|---|
| 561,986 | Gall | June 16, 1896 |
| 674,161 | Brown | May 14, 1901 |
| 921,815 | Erlandsson | May 18, 1909 |
| 2,349,505 | Lohne | May 23, 1944 |